(12) United States Patent
Dalton

(10) Patent No.: US 9,109,719 B2
(45) Date of Patent: Aug. 18, 2015

(54) SHUT-OFF VALVE

(75) Inventor: Martin Walter Dalton, Solihull (GB)

(73) Assignee: SURESTOP LIMITED, a British Corporation, England (GB)

(*) Notice: Subject to any disclaimer, the term of this patent is extended or adjusted under 35 U.S.C. 154(b) by 587 days.

(21) Appl. No.: 13/201,217

(22) PCT Filed: Feb. 10, 2010

(86) PCT No.: PCT/GB2010/050204
§ 371 (c)(1),
(2), (4) Date: Aug. 11, 2011

(87) PCT Pub. No.: WO2010/092380
PCT Pub. Date: Aug. 19, 2010

(65) Prior Publication Data
US 2012/0001114 A1    Jan. 5, 2012

(30) Foreign Application Priority Data

Feb. 12, 2009  (GB) .................................. 0902247.6

(51) Int. Cl.
*F01L 3/10* (2006.01)
*F16K 31/385* (2006.01)

(52) U.S. Cl.
CPC .................................. *F16K 31/385* (2013.01)

(58) Field of Classification Search
CPC .................................................... F16K 31/385
USPC ............................................ 251/25, 32, 107
See application file for complete search history.

(56) References Cited

U.S. PATENT DOCUMENTS

| | | | |
|---|---|---|---|
| 2,627,873 A * | 2/1953 | Bothe | 251/25 |
| 2,719,538 A * | 10/1955 | Cole et al. | 137/630.14 |
| 4,210,309 A | 7/1980 | Grenier | |
| 6,328,275 B1 * | 12/2001 | Yang et al. | 251/30.03 |
| 8,196,892 B2 * | 6/2012 | Glaun | 251/25 |

FOREIGN PATENT DOCUMENTS

| | | |
|---|---|---|
| DE | 2435877 | 3/1976 |
| EP | 1195547 | 4/2002 |

OTHER PUBLICATIONS

PCT International Search Report for PCT/GB2010/05204, May 28, 2010, Applicant: Dalton.

* cited by examiner

*Primary Examiner* — John K Fristoe, Jr.
*Assistant Examiner* — Christopher Ballman
(74) *Attorney, Agent, or Firm* — Pedersen and Company, PLLC; Ken J. Pedersen; Barbara S. Pedersen

(57) ABSTRACT

This invention relates to a shut-off valve, and primarily to a valve for shutting-off the flow of a fluid such as a mains water supply to commercial premises or a domestic dwelling. The shut-off valve (10) comprises a diaphragm valve and a pilot valve (30). The diaphragm valve has an inlet (14) and an outlet (16), a valve member (26) and a valve seat (22), the valve member having a closed position in which it engages the seat and prevents the flow of fluid from the inlet to the outlet, and an open position in which the valve member does not engage the seat and fluid can flow from the inlet to the outlet. A first fluid conduit (36) connects the inlet of the diaphragm valve to the inlet of the pilot valve, and a second fluid conduit (40) connects the outlet of the pilot valve to the outlet of the diaphragm valve. The pilot valve has an open position in which fluid can flow from the first fluid conduit to the second fluid conduit and a closed position in which fluid cannot flow from the first fluid conduit to the second fluid conduit. The invention is characterized in that the diaphragm valve has a control member (42, 44, 46) which is adapted to hold the valve member against the valve seat, whereby the diaphragm valve remains closed even if the pressure at its outlet equals or perhaps exceeds the pressure at its inlet.

15 Claims, 5 Drawing Sheets

SHUT-OFF VALVE

FIELD OF THE INVENTION

This invention relates to a shut-off valve, and in particular to a valve for shutting-off the flow of a fluid such as a mains water supply.

The invention is expected to find its greatest utility as a shut-off valve for the water supply to a domestic dwelling, and the following description will therefore relate primarily to such application. However, use of the invention for other liquid flows such as liquid petrochemicals, and in other applications such as the water supply to commercial and recreational premises, are not thereby excluded. Also, the invention is applicable to gas flows, i.e. it can be used to shut off the flow of a gas along a pipeline.

In this description, directional and orientational terms such as "up", "down", "lift" etc., refer to the valve in the orientation shown in FIGS. 1 and 3. For the avoidance of doubt, it will be understood that the valve may be used in other orientations, and the directional and orientational terms should be adjusted for those other orientations.

BACKGROUND TO THE INVENTION

The mains water supply usually enters a domestic dwelling through a single pipeline, and close to the point of entry a tap (known as a "stop-cock") is typically provided so that the water supply to the dwelling can be shut-off if required, for example if there is a water leak within the dwelling. The stop-cock is usually located out of sight, and is not always easily accessible, particularly for the elderly or infirm. In addition, the stop-cock may not need to be operated for many years, and might have become seized during that time, so that it is not possible for the dwelling occupier to operate it when it is ultimately required.

DISCLOSURE OF THE PRIOR ART

It is known to provide a shut-off valve which can be fitted into the mains supply adjacent to or instead of the stop-cock, which shut-off valve can be more easily operated, particularly by the elderly or infirm. In addition, certain designs are remotely operated so that the valve can be actuated from a convenient location.

One prior art device is disclosed in GB patent application 2,279,393. That document discloses an electrically-operated stop-cock which can be fitted to the mains supply pipe in addition to or instead of the manually-operated stop-cock. The electrically-operated stop-cock can be actuated by the dwelling occupier from a remote location.

The device of GB 2,279,393 has the major disadvantages of being expensive and complex, due to the requirement for electrical actuation. Also, it is indicated that in the event of an electrical failure the valve will close, shutting off the water supply, but that a magnet can be used to reopen the valve manually if desired. Clearly, it might not be desired that the water be shut off if there is a failure in the electricity supply, and the requirement to locate a suitable magnet, and then be able to open the valve manually, is likely to be extremely difficult.

Another prior device is disclosed in WO 97/05416. In that document there is provided a shut-off valve which can be actuated remotely, and which operates by water pressure alone, i.e. it requires no complex mechanical or electrical components. This document discloses a diaphragm valve located in a water supply pipeline, and which valve is normally biased closed. When it is desired for water to flow along the pipeline (which may be connected to a tap over a domestic sink for example), the user can depress an actuator which mechanically opens a pilot valve, which in turn opens the diaphragm valve and allows water to flow along the pipeline. When the user stops depressing the actuator the pilot valve closes and the diaphragm valve subsequently closes. The device is intended to save water use by cutting off the water supply to the tap when the actuator is not being depressed, in the event that the tap is left turned on, for example.

Another remote shut off valve is disclosed in EP 1 195 547. This valve also uses a diaphragm valve, the opening and closing of which is controlled by a pilot valve. The diaphragm valve is intended to be located close to the mains water inlet to a building for example, with the pilot valve being located conveniently for actuation when required. Ordinarily the pilot valve and the diaphragm valve are open allowing mains water to flow into the building, but when the pilot valve is closed the diaphragm valve will also close, shutting off the water supply.

SUMMARY OF THE INVENTION

It is an object of the present invention to provide an improved shut-off valve, and in particular a shut-off valve which can replace the stop-cock if desired.

Prior art shut-off valves such as that of EP 1 195 547 cannot usually replace the stop-cock since it is not possible to guarantee that the water flow will be prevented when the shut-off valve is closed. Operation of the diaphragm valve relies upon the differential pressure between the inlet and the outlet and if the differential pressure falls below a threshold value the diaphragm valve will not remain closed and water flow can occur. The threshold value of the differential pressure depends upon the particular diaphragm valve, but a pressure at the inlet of around 0.4 bar ($4 \times 10^4$ Pa) greater than the pressure at the outlet is typically required to ensure that the diaphragm valve remains fully closed.

It is not always possible to guarantee that the pressure at the inlet will exceed the pressure at the outlet by at least this threshold value, especially with a mains water supply to a domestic dwelling, and so the shut-off valves are usually used in addition to (and typically downstream of) the stop-cock.

The present invention seeks to provide a shut-off valve in which the valve can remain closed even with low differential pressures, and even with small back-pressures, so that the valve can be used to replace the stop-cock if desired. The shut-off valve can be remotely operated if desired.

According to the invention there is provided a shut-off valve comprising a diaphragm valve and a pilot valve, the diaphragm valve having an inlet and an outlet, a valve member and a valve seat, the valve member having a closed position in which it engages the seat and blocks the flow of fluid from the inlet to the outlet, and an open position in which the valve member does not engage the seat and fluid can flow from the inlet to the outlet, a first fluid conduit connecting the inlet of the diaphragm valve to the inlet of the pilot valve, and a second fluid conduit connecting the outlet of the pilot valve to the outlet of the diaphragm valve, the pilot valve having an open position in which fluid can flow from the first fluid conduit to the second fluid conduit and a closed position in which fluid cannot flow from the first fluid conduit to the second fluid conduit, characterised in that the diaphragm valve has a control member which engages the valve member and can be used to hold the valve member against the valve seat.

Preferably the control member includes a compression spring. Desirably, the compression spring lies between the valve member and a post. The use of a compression spring broadens the tolerance ranges for the post and other parts of the control member.

Desirably, the control member is movable between an operative position and an inoperative position, the control member acting to hold the valve member against the valve seat in its operative position.

Preferably, the control member is carried by the body of the diaphragm valve. Preferably also the body of the diaphragm valve carries a manually operable latch mechanism which can be used to move the control member between its operative and inoperative positions.

Desirably the latch mechanism includes a lock plate which can engage a part of the control member when the control member is in its operative position. Desirably also the lock plate is spring-biased towards the engaged position.

Preferably the manually operable latch mechanism has two functions, the first function being to disengage the lock plate from the control member, the second function being to move the control member from its operative position to its non-operative position. When it is desired to open the diaphragm valve the lock plate must first be disengaged from the control member so that the control member can subsequently be moved to its inoperative position. Desirably the manually operable latch mechanism also has a third function, namely to move the control member from its inoperative position to its operative position.

It will be understood that it is usually not possible manually to drive the valve member of a diaphragm valve against the valve seat, because the fluid pressure holding the valve member open is too great. Instead, it is necessary to cause the diaphragm valve to close under fluid pressure by first closing the pilot valve. Preferably, movement of the control member to its operative position also closes the pilot valve so that the diaphragm valve is caused to close by fluid pressure, and can be maintained closed by a combination of the fluid pressure and the mechanical force provided by the control member holding the valve member against the valve seat.

The mechanical force with which the control member holds the valve member against the valve seat can avoid any tendency of the diaphragm valve to open if the differential pressure falls close to zero, and can in some embodiments maintain the diaphragm valve closed in the presence of back-pressures (i.e. the pressure at the outlet being greater than the pressure at the inlet).

BRIEF DESCRIPTION OF THE DRAWINGS

The invention will now be described, by way of example, with reference to the accompanying drawings, in which.

DESCRIPTION OF THE EXEMPLARY EMBODIMENTS

Figure 1:
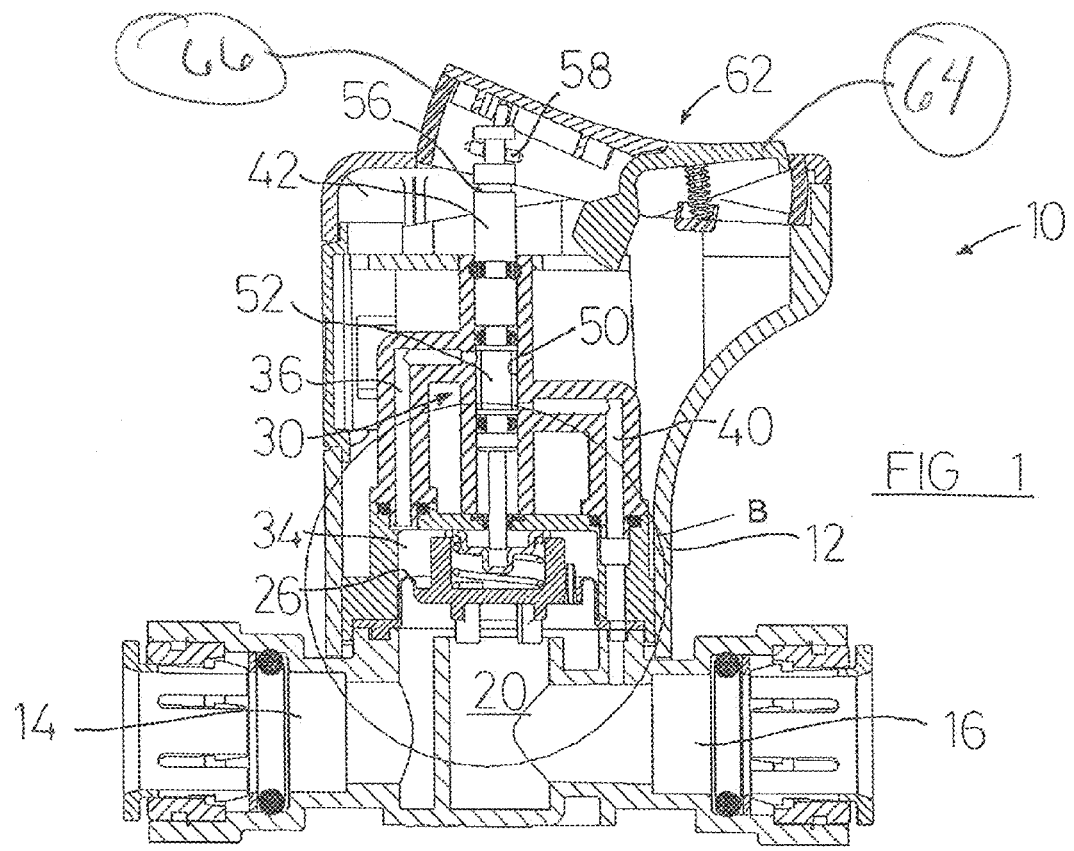
FIG. 1 is a side-sectional view of the shut-off valve according to the invention, with the diaphragm valve open.

FIGS. 1-4 show a shut-off valve 10 according to the present invention. The shut-off valve 10 includes a diaphragm valve having a body 12, which in common with prior art diaphragm valves has an inlet 14 and an outlet 16. The outlet 16 is in fluid communication with the hollow interior 20 of the valve seat 22, and the inlet 14 is in fluid communication with the chamber 24 surrounding the valve seat 22.

The valve member or diaphragm 26 is secured to the body 12, and is flexible so that it can alternately seal against the valve seat 22, in which case it closes off the flow of fluid from the chamber 24 to the hollow interior 20 (and so from the inlet 14 to the outlet 16), and be free of the valve seat, in which case fluid can flow from the chamber 24 to the hollow interior 20 (and so from the inlet 14 to the outlet 16).

The diaphragm valve of this embodiment shares many features of prior art diaphragm valves, as will be described here for ease of reference.

The position of the valve member 26 in relation to the valve seat 22 is controlled by a pilot valve 30. The valve seat 22 is substantially circular, and is surrounded by the chamber 24 which contains fluid at the pressure of the inlet 14 (for example the mains water supply pressure).

The pilot valve 30 is connected to the inlet 14 by way of a fluid pathway comprising an aperture 32 through the valve member 26, the control chamber 34, and a first fluid conduit 36. The pilot valve 30 is connected to the outlet 16 by a second fluid conduit 40.

Figure 3:
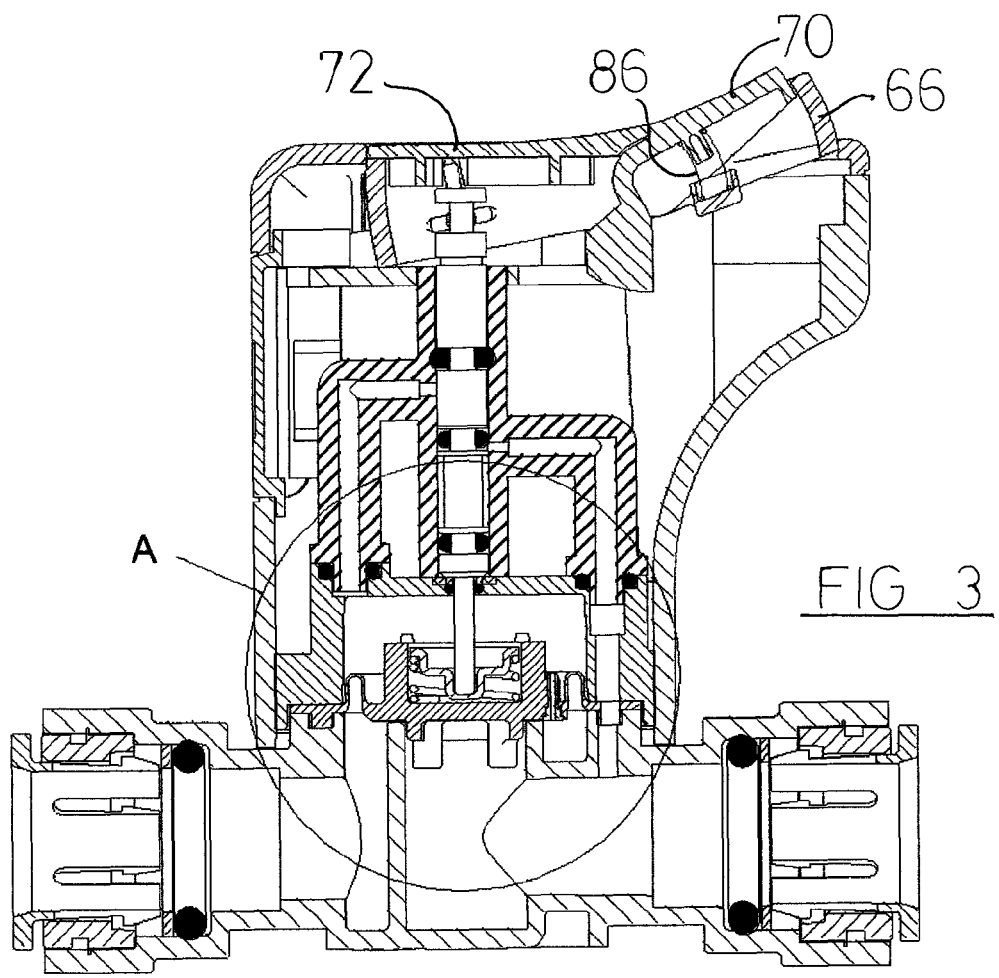
FIG. 3 is a view as FIG. 1 with the diaphragm valve closed.
Figure 4:
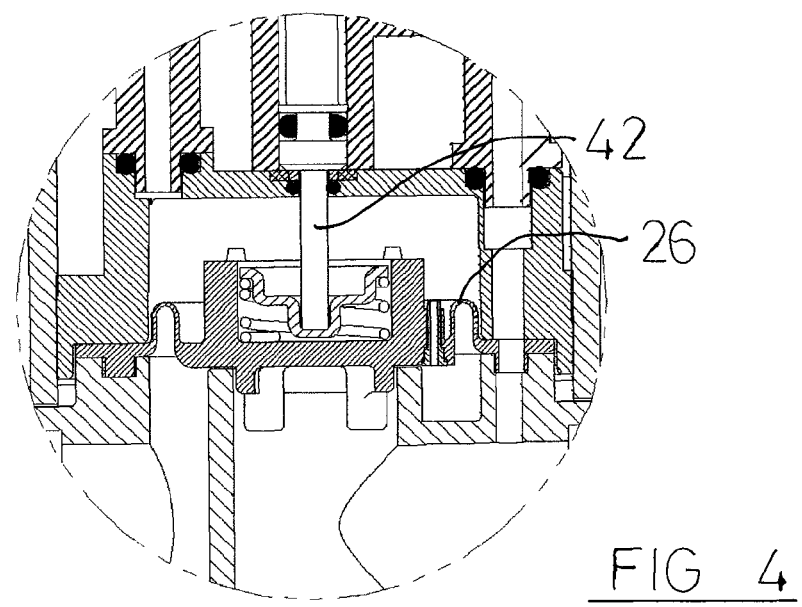
FIG. 4 is a detailed view of the circled region A of FIG. 3.

When the pilot valve 30 is closed as shown in FIGS. 3 and 4 the control chamber 34 is in communication with the inlet 14 but is not in communication with the outlet 16. The pressure within the control chamber 34 is therefore substantially that of the inlet 14. Since the inlet pressure is greater than the outlet pressure, and since the inlet pressure acts over a greater area of the valve member 26 within the control chamber 34 than within the chamber 24, the valve member 26 is driven against the valve seat 22.

When the pilot valve 30 is opened, however, the control chamber 34 is in fluid communication with the outlet 16 and the pressure within the control chamber 34 falls to substantially the pressure of the outlet 16. The greater pressure at the inlet acting within the chamber 24 lifts the valve member 26 and puts the inlet 14 in direct communication with the outlet 16.

In common with prior art diaphragm valves it is necessary that the greatest restriction to fluid flow through the pilot valve 30 occurs upstream of the control chamber 34, and this is usually achieved by ensuring that the cross-sectional area of the aperture 32 is significantly smaller than the cross-sectional area of the first and second fluid conduits 36, 40.

Embodiments of the present invention differ from conventional shut-off valves in that they have a control member which can hold the valve member 26 closed even if the differential pressure between the inlet 14 and outlet 16 is low or even if the pressure at the outlet 16 is slightly greater than the pressure at the inlet 14. Thus it will be understood that with a conventional diaphragm valve as described above closure of the valve member depends upon the difference in the pressure acting above and below the valve member, and the difference in the available area over which those pressures can act. In practice, many diaphragm valves have a threshold differential pressure of 0.5 bar or less ($5 \times 10^4$ Pa), but higher threshold differential pressures are known. Thus, if the pressure at the inlet is less than 0.5 bar greater than the pressure at the outlet the diaphragm valve will not remain closed, and some fluid flow from the inlet 14 to the outlet 16 will occur.

The present invention reduces the threshold differential pressure by providing a control member which can hold the valve member 26 against the valve seat 22 by an additional mechanical closure over and above the closure caused by fluid pressure.

Figure 2:
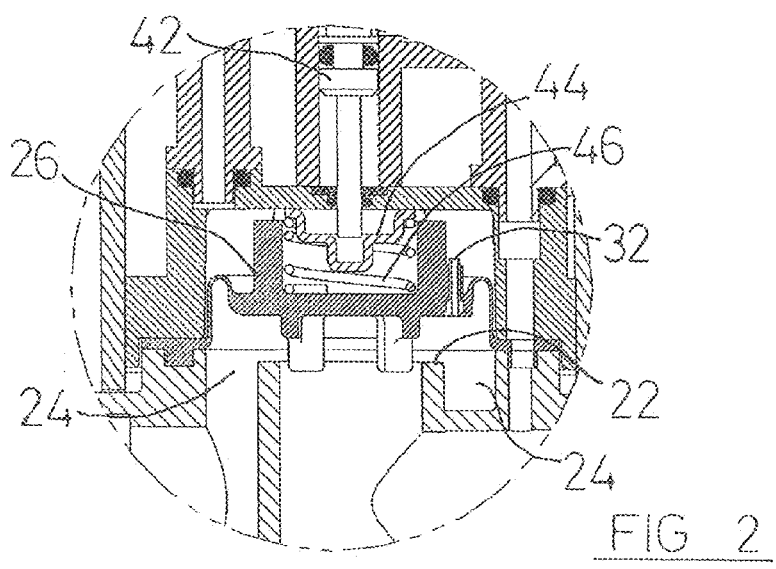
FIG. 2 is a detailed view of the circled region B of FIG. 1.

As shown in FIGS. 1-4, the shut-off valve 10 includes a control member comprising a control element or substantially rigid post 42, a spring cup 44 and a compression spring 46. The post 42 can be moved between its operative position (FIGS. 3 and 4) and its inoperative position (FIGS. 1 and 2).

It will be understood that in the embodiment of FIGS. 1-4 the post 42 also provides part of the pilot valve, this embodiment taking advantage of the fact that it is necessary to provide a guide for the post 42 within the body of the diaphragm member, and it is relatively simple to utilise a part of the guide as a cylinder 50 of the pilot valve 30, the cylinder 50 being connected to the first and second fluid conduits 36, 40. The post 42 is generally of a similar diameter to the cylinder 50 and so is a sliding fit therewithin, but has a part 52 which is of reduced diameter, and around which fluid can flow within the cylinder 50.

When the post of the control member is in its inoperative position (FIGS. 1 and 2) the part 52 lies within the cylinder 50 and fluid can flow from the first fluid conduit 36, around the part 52 and to the second fluid conduit 40. However, when the post of the control member is in its operative position (FIGS. 3 and 4) the flow of fluid from the first fluid conduit 36 to the second fluid conduit 40 is blocked by the post 42 and an O-ring seal fitted thereto.

When the pilot valve 30 is closed a differential pressure between the inlet 14 and the outlet 16 will cause the valve member 26 to move against the valve seat 22. The control member acts to hold the valve member 26 against the valve seat 22, by compressing the spring 46 by way of the spring cup 44.

The control member is locked in its operative position by way of a lock plate 54 (FIGS. 5,6) which locates in a groove 56 formed in the upper end of the post 42. The lock plate 54 is resiliently biased by a compression spring 60 towards the post 42, and will enter the groove 56 as soon as the post 42 is correctly positioned, i.e. as soon as the post 42 of the control means is moved to the operative position.

It will be understood that the compression spring 46 of the control member serves three functions. Firstly, the compression spring 46 reduces the adverse effects of manufacturing tolerances, i.e. it is not necessary that the post 42 (or spring cup 44) engages the valve member 26, so that the length of the post 42 is less critical to correct operation than would be the case without the spring.

Secondly, the compression spring 46 enables the post 42 to be locked by the lock plate 54 whilst the valve member 26 is still closing. Thus, it will be understood that the fluid pressure within the control chamber 34 will typically take several seconds to increase sufficiently to move the valve member 26 against the valve seat 22. It would be undesirable to require the user to press down the manually-operable latch mechanism 62 for an extended period of time until the lock plate 54 locks the post 42. Because of the compression spring 46, the post may be moved downwardly faster than the valve member 26, storing energy within the compression spring, which energy assists continued closing movement of the valve member 26. In the embodiment shown the gap between the spring cup 44 and the valve member 26 in the operative position (FIGS. 3 and 4) is small, so that in this embodiment the downwards movement of the post 42 can exceed the downwards movement of the valve member by only a small amount. In other embodiments the gap between the spring cup and the valve member can be greater, resulting in a reduced time for which the user must press down the latch mechanism 62.

Thirdly, the rating of the compression spring 46 can be varied to suit the application, it being understood that a weaker spring 46 will require less force to depress the manually-operable latch mechanism 62, but a stronger spring 46 will maintain the valve closed despite greater back-pressures. Applications in which the pressure at the outlet could exceed the pressure at the inlet by 1 bar for example can utilise a spring of sufficient strength to ensure that the valve member will not lift from the valve seat under such back-pressures. On the other hand, applications in which the user is expected to be frail with little likelihood of back-pressure (such as the mains water supply to accommodation for the elderly or infirm for example) can utilise a relatively weak spring.

Figure 5:
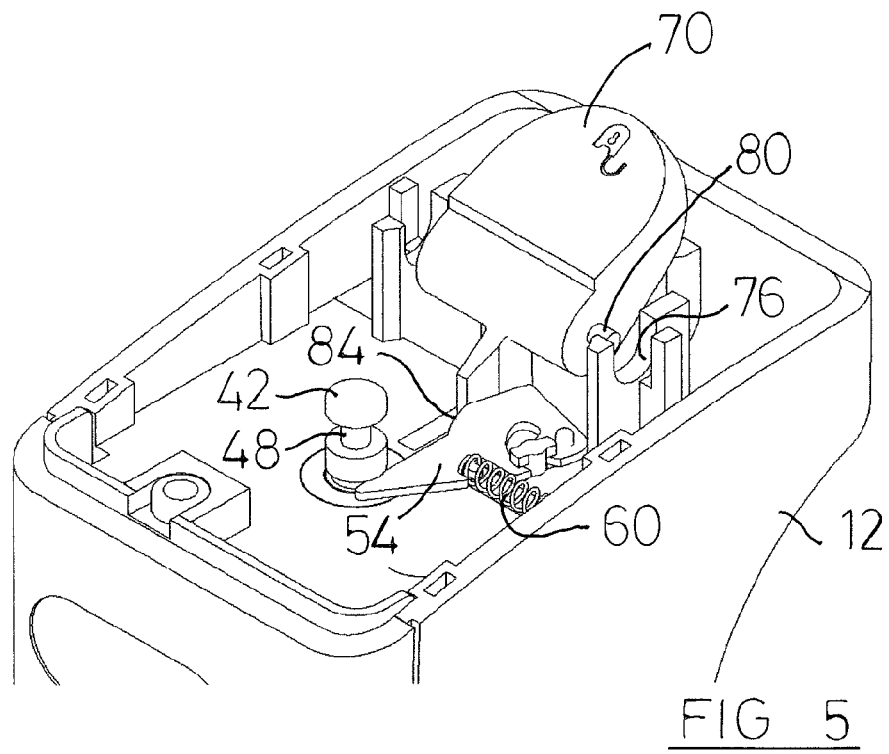
FIG. 5 is a view of part of the latch mechanism with the control member locked in its operative position.
Figure 6:
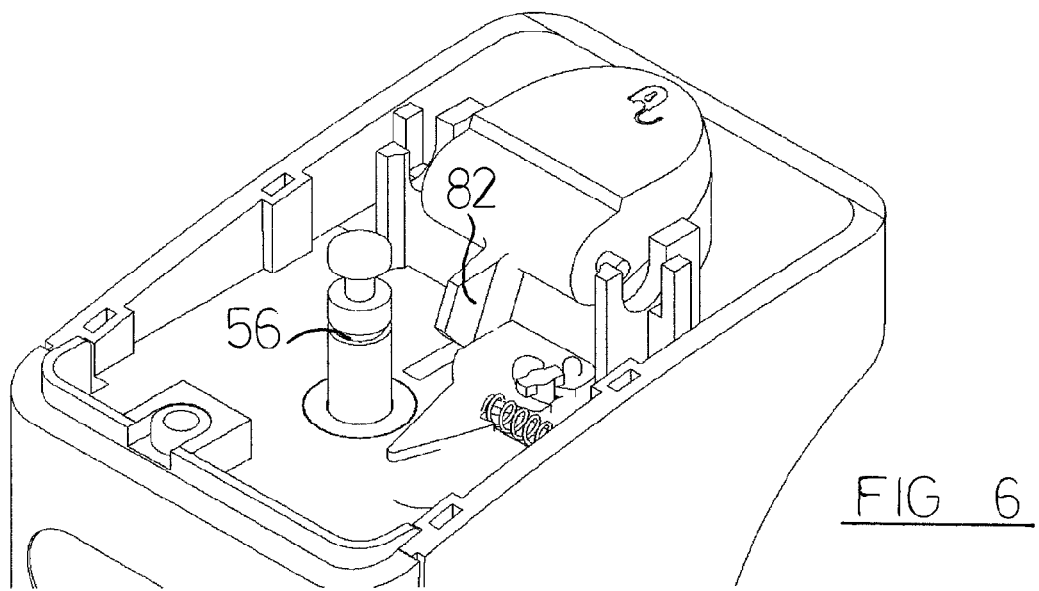
FIG. 6 is a view as FIG. 5 with the control member in its inoperative position.
Figure 8:
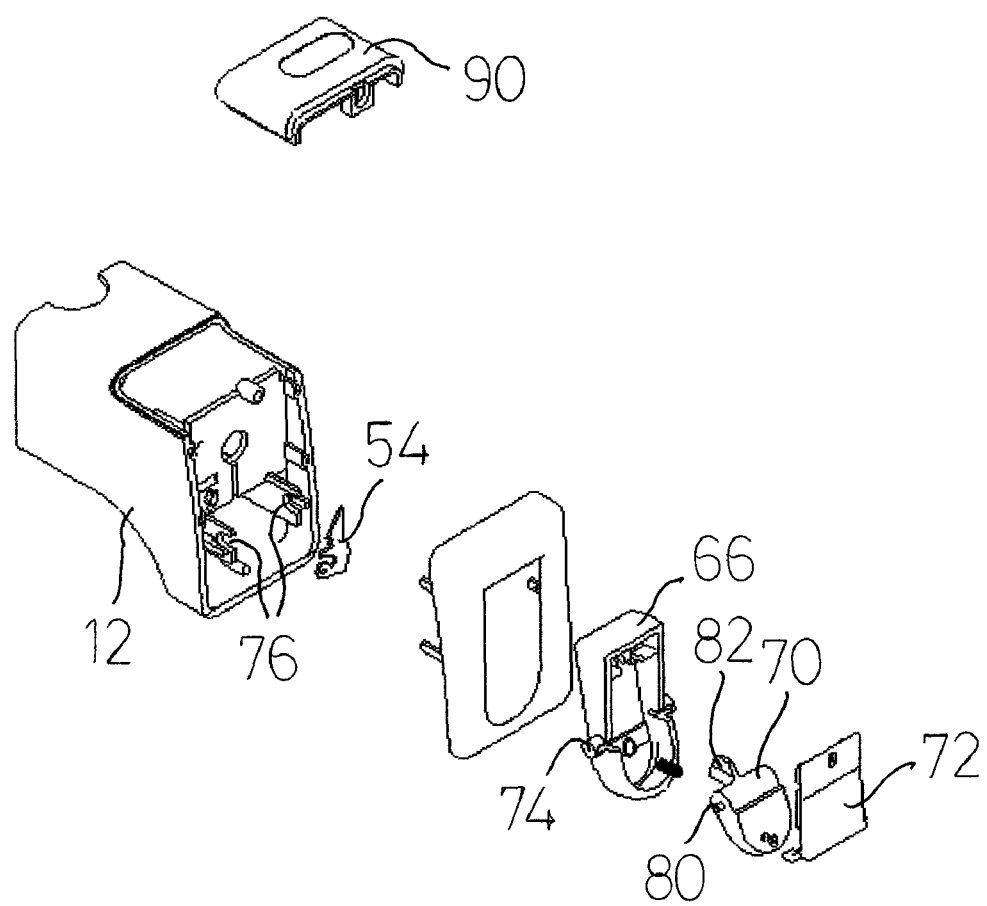
FIG. 8 is an exploded view of a part of the diaphragm valve body and the latch mechanism.

The operation of the manually-operable latch mechanism 62 is best shown in relation to FIGS. 5, 6 and 8. The latch mechanism incorporates a press button 64 which is made up of separate components, specifically a primary element 66, a secondary element 70 and a cover piece 72 (FIG. 8).

The primary element 66 has two aligned pivot lugs 74, which are located in aligned recesses 76 carried by the body 12 of the diaphragm valve. The secondary element also has two aligned pivot lugs 80, which in this embodiment are also located in the same aligned recesses 76. The separate pivot lugs 74 and 80 allow the secondary element 70 to pivot relative to the primary element 66.

The top end of the post 42 is formed with a groove 48, and the primary element 66 has a fork 58 (FIG. 1) which accommodates the groove 48. The post 42 is therefore positively connected to the primary element 66 so that pivoting movement of the primary element 66 causes corresponding upward and downwards movement of the post 42. Downwards movement of the post 42 is caused by depression of the left-hand part of the primary element 66 as drawn in FIGS. 1-4, i.e. to the left of the pivot axis. Upwards movement of the post 42 is caused by depression of the right-hand part of the primary element 66 as drawn in FIGS. 1-4.

As above described, the post 42 is locked in its operative position by the lock plate 54, and cannot be moved from that position until the lock plate 54 is released from the groove 56. As the post 42 is pressed down towards the valve member 26 by manual pressure upon the left-hand part (as viewed in FIG. 1) of the primary element 66, it reaches the position in which the groove 56 is aligned with the lock plate 54, whereupon the lock plate 54 is driven into the groove 56 by the spring 60.

The lock plate 54 is released from the groove 56 by the secondary element 70. The action of the secondary element 70 is demonstrated by FIGS. 5 and 6 (the primary element 66 is not shown in these figures for ease of understanding). As the secondary element 70 is pivoted downwardly its blade 82 engages the cammed surface 84 of the lock plate 54, driving the lock plate 54 out of the groove 56.

Once the lock plate 54 has been released from the groove 56 the post 42 can be lifted by pivoting movement of the secondary element 70 and primary element 66 together. A small compression spring 86 (FIG. 3) lies between the primary and secondary elements and moves the blade 82 out of engagement with the cammed surface 84 when the secondary element 70 is released.

As the post 42 is lifted from the position shown in FIGS. 3 and 4 its reduced diameter part 52 enters the cylinder 50, opening the pilot valve 30 and reducing the pressure within the control chamber 34 and allowing the valve member 26 to lift away from the valve seat 22.

In another embodiment the post 42 of the control member performs only the function of the mechanical lock upon the valve member, and does not also provide the pilot valve.

In yet another embodiment the pilot valve is remote, perhaps being connected to the diaphragm valve by way of flexible conduits as in EP 1 195 547. In such embodiments it would be possible to control the diaphragm valve by way of fluid pressure controlled by the remote pilot valve, and by way of a local mechanical control member. However, it would be preferred in such embodiments to utilise two pilot valves, one remote pilot valve and one local pilot valve such as the pilot valve 30, the pilot valves operating in series so that closing either pilot valve would cause the diaphragm valve to close. Such embodiments are preferred since the diaphragm valve could be closed and locked locally whilst the remote pilot valve was disconnected, for example to re-site the remote pilot valve. Unless the diaphragm valve was held closed by a local pilot valve it might inadvertently open if the remote pilot valve is disconnected.

A suitable embodiment utilising an additional remote pilot valve in series with the pilot valve 30 could replace the first fluid conduit 36 by two fluid conduits, one of the fluid conduits connecting the control chamber 34 to the remote pilot valve and the other fluid conduit connecting the remote pilot valve to the pilot valve 30. The remote pilot valve would then be in series with the pilot valve 30.

Figure 7:
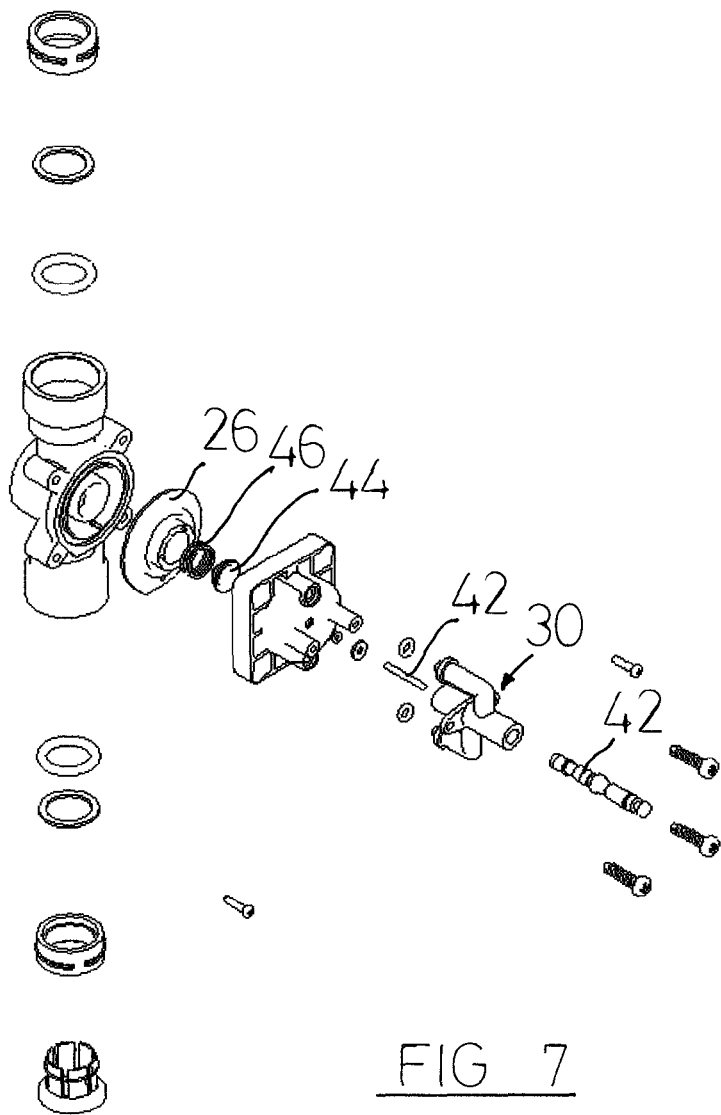
FIG. 7 is an exploded view of some of the components of the diaphragm valve, including the control member.

If it was desired to provide the opportunity to the user or installer to fit a remote pilot valve in addition to the local pilot valve 30, then the pilot valve 30 in FIG. 7 could be replaced by a separate component which is generally similar to the pilot valve 30 but has two open-ended conduits in place of the fluid conduit 36, one of the open-ended conduits being in communication with the control chamber 34 and the other of the open-ended conduits being in communication with the pilot valve 30. The two open-ended conduits would typically be connected directly together by the valve manufacturer, suitably by a joining conduit. If the user or installer does not require a remote pilot valve then the (local) pilot valve could be operated similarly to the pilot valve 30, with fluid flowing from the control chamber 34 trough the pilot valve by way of the joining conduit. Alternatively, if a remote pilot valve is desired the open-ended conduits could be accessed by removal of the cover element 90 (FIG. 8) and subsequent removal of the joining conduit, the open-ended conduits then being connected by respective fluid conduits to a remote pilot valve. This would provide a diaphragm valve having two pilot valves in series, either or both of which can be closed in order to close the diaphragm valve.

In an alternative embodiment the lock plate 54 could be supported at both of its ends so as to avoid the likelihood that the lock plate will lift under the force of the compression spring 46. In another alternative the pivotable lock plate 54 could be replaced by a slide member.

The shut-off valve 10 preferably uses quick-release connectors for all of the fluid connections. Many different types of quick-release connector, including "JOHN GUEST®" connectors for example, are known for connecting fluid conduits to components such as diaphragm valves.

The invention claimed is:

1. A shut-off valve comprising a diaphragm valve and a pilot valve, the diaphragm valve having an inlet and an outlet, a valve member and a valve seat, the valve member having a closed position in which it engages the seat and prevents the flow of fluid from the inlet to the outlet, and an open position in which the valve member does not engage the seat and fluid can flow from the inlet to the outlet, a first fluid conduit connecting the inlet of the diaphragm valve to the inlet of the pilot valve, and a second fluid conduit connecting the outlet of the pilot valve to the outlet of the diaphragm valve, the pilot valve having an open position in which fluid can flow from the first fluid conduit to the second fluid conduit and a closed position in which fluid cannot flow from the first fluid conduit to the second fluid conduit, wherein the diaphragm valve has a control member which is adapted to hold the valve member against the valve seat, the control member being movable relative to the valve member between an operative position and an inoperative position, the control member in its operative position holding the valve member against the valve seat the control member moving towards the valve seat as it moves from its inoperative position to its operative position.

2. The shut-off valve according to claim 1 in which the diaphragm valve further has a control chamber and the valve member in its closed position is pressed against the valve seat by a first force that is dependent in part upon the pressure within the control chamber, and wherein the control member in its operative position holds the valve member against the valve seat by a second force that acts in addition to the first force.

3. The shut-off valve according to claim 2 in which the control member includes a post and a compression spring, and the compression spring lies between the post and the valve member.

4. The shut-off valve according to claim 3 in which a part of the compression spring engages the valve member.

5. The shut-off valve according to claim 3 wherein said post of the control member and said pilot valve are portions of an elongated unit that has a first end, a second end, and a longitudinal axis between the first end and second end that is parallel to a central axis of the diaphragm valve, wherein the elongated unit is adapted to slide longitudinally toward the valve member to apply said second force and to close said pilot valve, and the elongated unit is adapted to slide longitudinally away from the valve member to remove said second force and to open said pilot valve.

6. The shut-off valve according to claim 1 in which the control member is mounted to a body of the diaphragm valve.

7. The shut-off valve according to claim 6 in which the body of the diaphragm valve carries a manually operable latch mechanism configured to move the control member from its inoperative position to its operative position.

8. The shut-off valve according to claim 7 which includes a movable lock plate which has an engaged position in which it engages a part of the control member when the control member is in its operative position.

9. The shut-off valve according to claim 8 in which the lock plate is spring-biased towards its engaged position.

10. The shut-off valve according to claim 9 in which the manually operable latch mechanism is also adapted to move the control member from its operative position to its inoperative position and has an element which is configured to disengage the lock plate from the control member.

11. The shut-off valve according to claim 10 in which the manually operable latch mechanism has a fork which engages a groove in the control element.

12. The shut-off valve according to claim 11 in which the manually-operable latch mechanism has a two-piece press button, a primary element of the press button carrying the fork, and a secondary element of the press button carrying the element which is configured to disengage the lock plate from the control member.

13. The shut-off valve according to claim 12 in which the control member includes a control element, the control element being located within a guideway formed in the body of the diaphragm valve.

14. The shut-off valve according to claim 13 in which a section of the guideway provides a fluid chamber of the pilot valve, the fluid chamber being connected to the first fluid conduit and the second fluid conduit, and in which the part of the control element lies within the fluid chamber, the control element being movable between operative and inoperative positions, the fluid path from the first fluid conduit to the second fluid conduit by way of the fluid chamber being blocked by the control element in its operative position.

15. A shut-off valve comprising a diaphragm valve and a pilot valve, the diaphragm valve having an inlet and an outlet, a valve member and a valve seat, the valve member having a closed position in which it engages the seat and prevents the flow of fluid from the inlet to the outlet, and an open position in which the valve member does not engage the seat and fluid can flow from the inlet to the outlet, a first fluid conduit connecting the inlet of the diaphragm valve to the inlet of the pilot valve, and a second fluid conduit connecting the outlet of the pilot valve to the outlet of the diaphragm valve, the pilot valve having an open position in which fluid can flow from the first fluid conduit to the second fluid conduit and a closed position in which fluid cannot flow from the first fluid conduit to the second fluid conduit, wherein the diaphragm valve has a control mechanism for the valve member, the control mechanism including a control member and a latch mechanism, the control member being movable relative to the valve member between an operative position and an inoperative position, the control member in its operative position holding the valve member against the valve seat, the control mechanism being configured to allow manual movement of the control member from its inoperative position to its operative position, the latch mechanism retaining the control member in its operative position, the control mechanism being further configured to allow manual release of the latch mechanism and permit movement of the control member from its operative position to its inoperative position.

* * * * *